Aug. 16, 1938.  C. T. DOMAN  2,126,876
TRANSMISSION UNIT FOR MOTOR VEHICLES
Filed March 4, 1937   2 Sheets-Sheet 1

INVENTOR.
Carl T. Doman
BY Bodell & Thompson
ATTORNEYS.

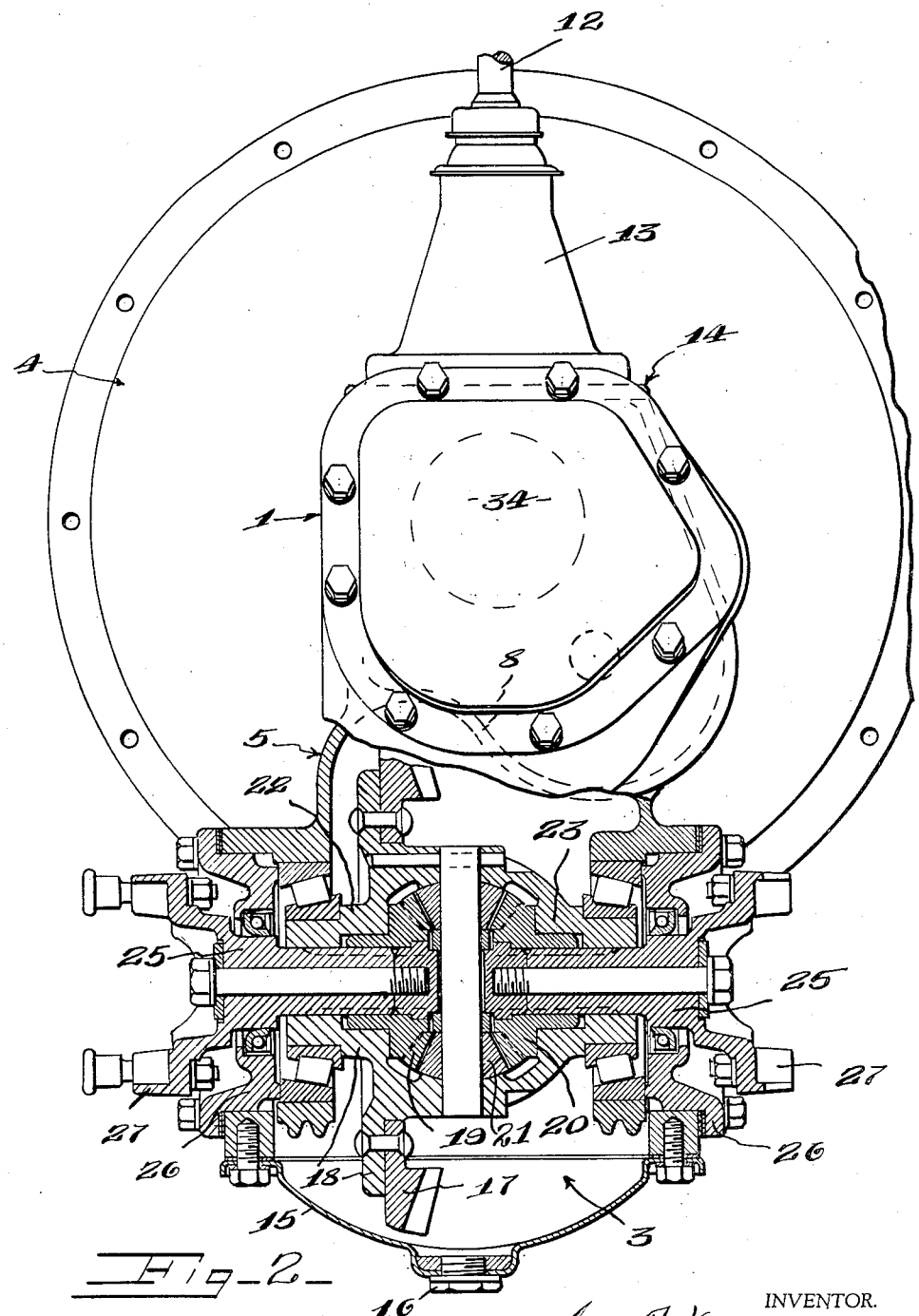

Patented Aug. 16, 1938

2,126,876

UNITED STATES PATENT OFFICE 2,126,876

TRANSMISSION UNIT FOR MOTOR VEHICLES

Carl T. Doman, Geddes, N. Y.

Application March 4, 1937, Serial No. 129,003

5 Claims. (Cl. 74—326)

This invention relates to a transmission line, or a power line unit for motor vehicles, and has for its object a unit consisting primarily of a change speed gearing, differential gearing and propeller shaft between the two gearings, all built into or supported by a single compact unitary support or casing, and also such a multiple unit which is secured, as a unit, to the power plant or engine and includes the clutch or bell housing secured to the fly wheel housing of the engine of the motor vehicle.

It also has for its object a unitary casing having individual compartments or boxes for the change speed gearing, the differential gearing and the propeller shaft or connecting shaft between them, so as to take up a minimum lengthwise space and also a minimum widthwise space.

It also has for its object the general relative arrangement of the change speed gearing, differential gearing and propeller shaft in a support or casing common to all of them.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 2 is a rear elevation of parts seen in Figure 1, the differential gear compartment being shown in section.

Figure 1:
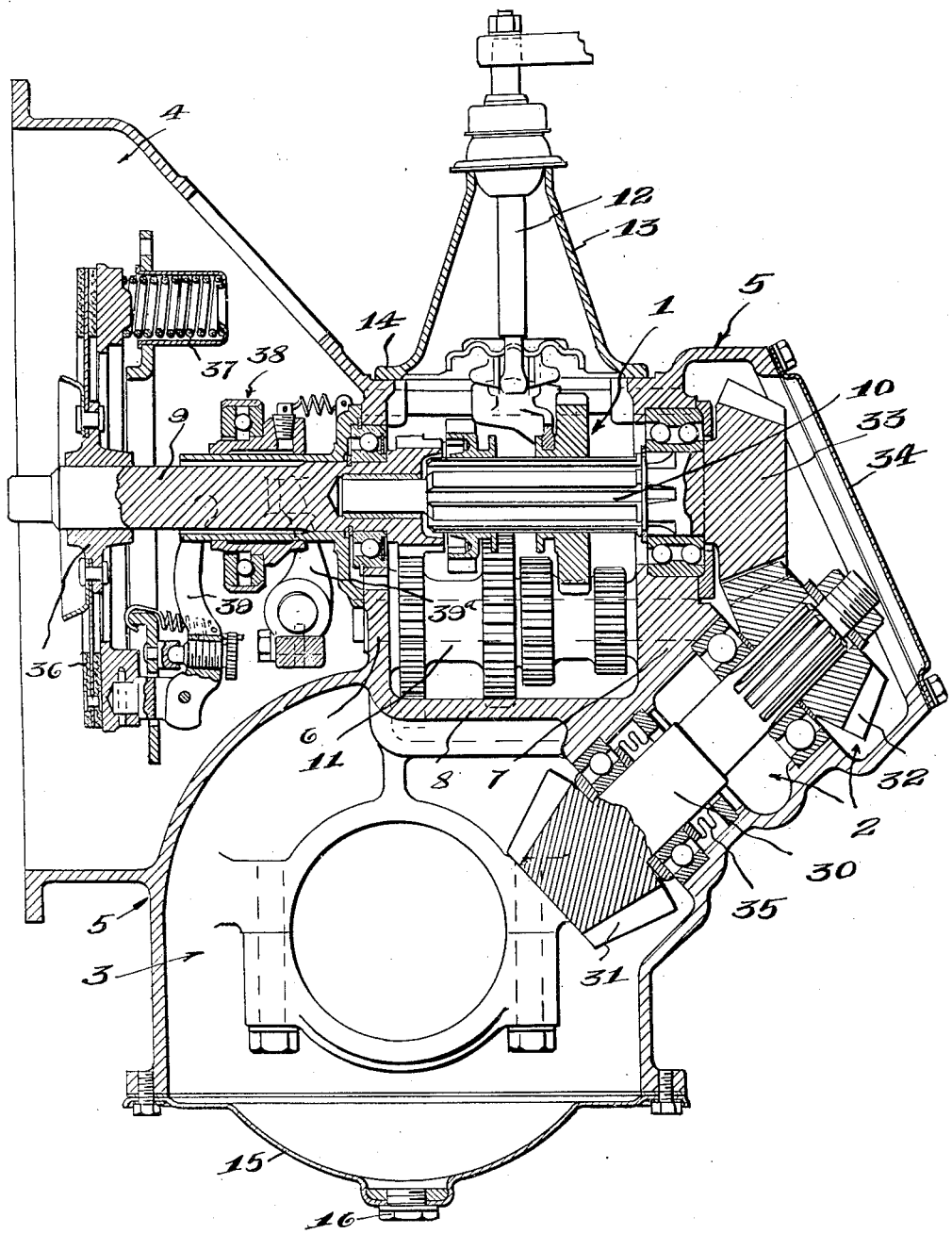
Figure 1 is a longitudinal sectional view of this transmission unit, the differential mechanism being removed.

This transmission unit comprises a casing having three individual or separate compartments, change speed gearing in one compartment having its driven or output shaft extending into a second compartment, a driven gear, which is usually the ring gear of a differential gearing in a third compartment, and the propeller shaft or what corresponds to a propeller shaft in a second compartment, which is interposed between the first and third compartments, the propeller shaft having a gear or pinion meshing with the ring gear of the differential, and a pinion at its other end meshing with a pinion on the output shaft of the change speed gearing.

The unit also comprises a fourth compartment at the end of the first compartment opposite to that at which the output shaft is located and the change speed gearing has its drive shaft or the stem of its stem gear extending into the fourth compartment, this drive shaft being the clutch shaft on which the shiftable clutch element of the main clutch is mounted. The fourth or clutch compartment is bolted to the fly wheel housing of the engine of the vehicle in which the equipment is installed.

The casing, which houses the three individual or separate compartments, is a one-piece integral structure, and the compartments are separated from each other, and oil sealed from each other, so that the oil from the gear box or change speed gearing compartment can not work its way into the differential gear compartment, although it is inconsequential whether or not the oil works its way into the second compartment.

1, 2 and 3 designate, respectively, the change speed gearing compartment, propeller shaft compartment, and the differential gear compartment, and 4 designates the clutch compartment. These compartments constitute a unitary rigid and preferably one-piece or integral casing designated generally 5. The change speed gear compartment 1 constitutes the usual gear box having front, rear and bottom walls 6, 7 and 8, the bottom wall 8 separating it from the third or differential gear compartment 3 and from the propeller shaft compartment 2. The transmission gearing is of any well known construction including a drive shaft 9, driven or output shaft 10 journalled respectively in axial alinement in the front and rear walls 6, 7, the countershaft 11 journalled in the front and rear walls 6, 7, suitable gearing between the shafts including shiftable elements operable to produce, for instance, first, second and third speeds forward and a reverse. The shiftable elements are operated by a selecting and shifting lever 12 mounted in the usual tower 13 on the removable cover 14 of the gear box or compartment 1 and operable from the outside of the tower in any well known manner. The gearing itself forms no part of this invention. Some of the gearing is assembled in the gear compartment through the open top normally closed by the cover 14.

The transmission or output shaft 10 extends into the second compartment 2 and the drive shaft 9 extends through the front wall 6 of the gear compartment 1 into the clutch housing 4, the drive shaft 9 being the stem of the stem gear of the transmission and constituting the clutch shaft.

The differential gear compartment or housing 3 is located vertically relatively to the transmission compartment 1 and here shown as directly below the same, with the upper wall of the compartment 3 constituting the bottom wall 8 of the gear compartment 1. The compartment 3 has a removable bottom plate 15 which is also formed with a drain plug 16. The parts of the differential gearing are assembled in the compartment 3 through the open bottom normally closed by the bottom plate 15.

17 designates the ring gear of the differential gearing, this being secured to a flange on the cage 18 of the differential gearing. 19 and 20 designate side gears of the differential, and 21, the compensating pinions. The side gears 19, 20 are suitably mounted in hubs 22, 23 on the cage 18, which hubs are journalled in suitable bearings in the walls of the differential gear housing or compartment 3. The side gears receive axle shaft sections 25, which are also journalled in suitable bearings in end plates 26 of the differential gear housing, these shaft sections 25 being shown as provided with universal joint sections 27 for connection with companion sections on axle shafts, not shown.

The drive wheels of the vehicle are mounted on the ends of the axle shafts, and these shafts and their housings are so mounted as to have an individual up and down spring action or knee action. This feature per se forms no part of the invention.

The axis of the differential gearing or of the ring gear 17 is in front of the rear end of the output shaft 10.

30 designates a propeller shaft or what corresponds to the propeller shaft in the compartment 2, this shaft 30 being arranged at an acute angle to the output shaft 10 and extending reversely relative to the output shaft 10 at an acute angle thereto from the rear of the unit forwardly under the transmission gearing, and it is provided at its lower forward end with a pinion 31 meshing with the ring gear 17 and provided with a pinion 32 at its upper end meshing with the pinion 33 on the output shaft 10. The rear wall of the compartment 2 is a removable cover plate 34. The shaft 30 with its pinion 31, the oil seal 35 and the journal bearing adjacent thereto are assembled in the compartment 2, through the compartment 3. The pinion 32 is assembled on the shaft 30 through the open rear side normally closed by the plate 34. Also, the gear 33 and the output shaft 10 which is a stem of the stem gear 33 are assembled in the compartments 1 and 2 through the open side of the compartment 2 normally closed by the plate 34.

The transmission gear here shown is designed to be mounted in the front of the vehicle, where the front wheels are the drive wheels. The clutch compartment 4 is at the front end and the propeller shaft 2 at the rear end, and the terms "front" and "rear" or "forward" and "rearward" are used for brevity's sake. It will be borne in mind that in some installations, as for instance, with the engine mounted in the rear end driving the rear axle, the clutch compartment 4 may be at the rear end and the propeller shaft compartment 2 at the front end in such location.

The various shafts are mounted in anti-friction bearings, and an oil seal 35 of any suitable construction is interposed between the compartment 2 and the compartment 3 to prevent oil from the change speed gearing compartment 1 from mixing with the oil from the differential compartment 3.

The shaft 9, as before stated, extends into the clutch housing or bell housing 4 on which is mounted the driven element of the main clutch of the vehicle. The clutch element may be of any suitable construction. 36 designates the driven disk of a clutch keyed to and slidable axially of the shaft 9 and being pressed into position by clutch springs 37 and thrown out against the action of the clutch springs by suitable throw-out mechanism, including a throw-out collar 38, levers 39, throw-out yoke 39a, the last being mounted in the clutch housing 4 and operable by the clutch pedal in the usual manner.

Owing to the arrangement of the various compartments or the arrangement of compartments 3 and 1, one above the other, the compartment 2 in the rear of the compartments 1 and 3, and the clutch compartment 4 in front of the compartment 1, this transmission unit including the change speed gear box, differential gear housing and propeller shaft housing, is a particularly compact and strong unit.

I claim:

1. In a transmission unit, a casing having three separate compartments, change speed gearing in one compartment having its output shaft extending into a second compartment, a driven gear in a third compartment and a propeller shaft in the second compartment and having a pinion at one end meshing with the driven gear in the third compartment, and gearing in the second compartment between the propeller shaft and the output shaft of the change speed gearing, the first and third compartments being arranged one above the other and the second compartment being arranged in a generally upright position between the first and third compartments at one side of the first and third compartments.

2. In a transmission unit, a casing having three separate compartments, change speed gearing in one compartment having its output shaft extending into a second compartment, a driven gear in a third compartment and a propeller shaft in the second compartment and having a pinion at one end meshing with the driven gear in the third compartment, and gearing in the second compartment between the propeller shaft and the output shaft of the change speed gearing, the first and third compartments being arranged one above the other and the second compartment being arranged in a generally upright position between the first and third compartments at one side thereof, and the propeller shaft in the second compartment extending in a reverse direction relative to the output shaft and being arranged at an acute angle to the output shaft.

3. In a transmission unit, a unitary casing having four separate compartments, change speed gearing in one compartment having its output shaft extending into a second compartment, a driven gear in the third compartment and a propeller shaft in the second compartment and having a gear at one end meshing with the driven gear, gearing in the second compartment between the output shaft and the propeller shaft of the change speed gearing, the fourth compartment located at the end of the change speed gearing compartment opposite to that through which the output shaft extends and the change speed gearing having a drive shaft extending into the fourth compartment, said drive shaft being a clutch shaft, and a shiftable clutch element on the clutch shaft, the third compartment being arranged below the change speed gear compartment and the second and fourth compartments being arranged at opposite ends of the first compartment, the propeller shaft in the second compartment extending reversely relative to the output shaft at an acute angle to the output shaft.

4. In a power transmission unit for motor vehicles, a change speed transmission gearing including a horizontally extending output shaft having a gear at its outer end, a differential gearing arranged below and adjacent the change speed gearing and including a ring gear, the axis of the differential gearing being arranged below and in front of the outer end of the output shaft, a propeller shaft between the rear end of the output shaft and the ring gear having a pinion meshing with the ring gear and a pinion meshing with the gear on the output shaft, the propeller shaft inclining reversely relatively to the output shaft and being arranged at an acute angle to the output shaft, and a unitary support for the change speed gearing, the differential gearing and the propeller shaft.

5. In a power transmission unit, a casing having four compartments, change-speed gearing in one compartment having its output shaft extending into a second compartment, a driven gear in the third compartment, and a propeller shaft in the second compartment and having a pinion at one end meshing with the driven gear, and motion transmitting connections in the second compartment between the output shaft and the propeller shaft, the fourth compartment being located at the end of the change-speed gearing compartment opposite to that through which the output shaft extends, and the change-speed gearing having a drive shaft extending into the fourth compartment, said drive shaft being a clutch shaft and a shiftable clutch element on the clutch shaft, the third compartment being arranged below the first compartment and the second and fourth compartments being arranged at opposite ends of the first compartment, said compartments being arranged in a cluster, with the first, second and fourth compartments having separating walls in common with the third compartment.

CARL T. DOMAN.